(12) United States Patent
Chen et al.

(10) Patent No.: US 8,371,165 B2
(45) Date of Patent: Feb. 12, 2013

(54) MEMS GYROSCOPE

(75) Inventors: Tsung-Lin Chen, Taipei (TW);
Chien-Yu Chi, Wuri Township, Taichung County (TW); Chia-Wei Lee, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 315 days.

(21) Appl. No.: 12/845,370

(22) Filed: Jul. 28, 2010

(65) Prior Publication Data

US 2011/0259100 A1 Oct. 27, 2011

(30) Foreign Application Priority Data

Apr. 27, 2010 (TW) .............................. 99113261 A

(51) Int. Cl.
*C01C 19/56* (2006.01)
(52) U.S. Cl. .................................................. 73/504.12
(58) Field of Classification Search ............... 73/504.12, 73/504.13, 504.14, 504.04, 504.02; 702/141–145, 702/150–151
See application file for complete search history.

(56) References Cited

U.S. PATENT DOCUMENTS

| | | | | |
|---|---|---|---|---|
| 6,332,103 B1 * | 12/2001 | Steenson et al. | ................... | 701/1 |
| 7,814,793 B2 * | 10/2010 | Sato | ........................... | 73/504.12 |
| 8,166,817 B2 * | 5/2012 | Chen et al. | ................. | 73/504.14 |

* cited by examiner

*Primary Examiner* — Helen C. Kwok
(74) *Attorney, Agent, or Firm* — Muncy, Geissler, Olds & Lowe, PLLC

(57) ABSTRACT

An MEMS gyroscope is disclosed, capable of computing the rotating angle of a DUT being attached thereto without the need to execute an off-line calibration process, of precluding the execution of an integration process, and of executing an on-line compensation process for the error introduced by the sensing circuit defect and by the mechanical structure defect of its gyroscope module. The disclosed MEMS gyroscope comprises: a gyroscope module, a sensing module coupled with the gyroscope module, and a control module couple with the gyroscope module and the sensing module, respectively. The control module receives the system dynamic of the gyroscope module sensed by the sensing module, and applies a gyroscope control method for controlling the gyroscope module and computing the rotating angle of the DUT. Moreover, the control module outputs a control signal including two extra frequency signals, to the gyroscope module, for driving the gyroscope module into operation.

12 Claims, 8 Drawing Sheets

--- outputting a preliminary control signal including a first extra frequency signal and a second extra frequency signal to the gyroscope module, for driving the gyroscope module

↓ estimating estimated value of the plurality of system parameters based on the received system dynamic, then calculating a first compensation signal based on the estimated value of the plurality of system parameters, wherein the first compensation signal includes the first extra frequency signal and the second extra frequency signal

↓ outputting the first compensation signal to the gyroscope module

↓ estimating another estimated value of the plurality of system parameters based on another received system dynamic, then calculating a second compensation signal based on the another estimated value of the plurality of system parameters, wherein the second compensation signal includes the first extra frequency signal and the second extra frequency signal

↓

Comparing the estimated value of the plurality of system parameters with the previously estimated value of the plurality of system parameters, and when the estimated value of the plurality of system parameters are the same with the previously estimated value of the plurality of system parameters, applying a filter unit and an angle calculating unit to calculate the rotating angle of the DUT which the MEMS gyroscope according to the first embodiment of the present invention being attached thereto, based on the system dynamic at the time

MEMS GYROSCOPE

BACKGROUND OF THE INVENTION

1. Field of the Invention

The present invention relates to an MEMS gyroscope and, more particularly to the MEMS gyroscope capable of precluding the execution of an off-line calibration process for the error introduced by the sensing circuit defect and by the mechanical structure defect of its gyroscope module. By attaching the MEMS gyroscope to a DUT, the rotating angle of the DUT can be computed without the execution of an integration process.

2. Description of Related Art

In recent years, the application field of the MEMS gyroscope has been enlarged dramatically, such as being used as the angle measuring unit of a motion sensor of a handheld device. However, due to the intrinsic limitation thereof, such as the sensing circuit defect and mechanical structure defect introduced by the MEMS manufacturing process, the precision range of the angle measurement of the MEMS gyroscope still needs to be improved dramatically. As a result, an off-line calibration is required to be executed, after the conventional MEMS gyroscope has been used for measuring angle for a certain amount of times, for limiting the error to be within an acceptable range.

For eliminating the influence of the mechanical structure defect on the precision range of the angle measurement, the industry has promoted several approaches. For example, adopting complex designs on the element of the MEMS gyroscope, executing specially-designed MEMS manufacturing processes, or applying additional post manufacturing processes. However, these approaches will increase the manufacturing cost of the conventional MEMS gyroscope. Moreover, the complex design of the element of the MEMS gyroscope will lower the yield rate of the overall manufacturing process of the conventional MEMS gyroscope. Therefore, further improvement on these approaches is required.

Besides, for eliminating the influence of the sensing circuit defect on the precision range of the angle measurement, the industry has promoted several approaches. For example, modulation, switch capacitor architecture, or correlated double sampling (CDS). These approaches have been applied for eliminating the non-ideal factor (i.e. the sensing circuit defect) commonly seen in the sensing circuit (i.e. the circuit including a variable capacitance capacitor and a charge amplifier), parasitic capacitance produced by the conductive wire, amount of the output signal drift of the operational amplifier, uncertainty of the bias voltage, asymmetry of the differential variable capacitance capacitor. However, these approaches are not only too complex, but also require the additional installation of a related circuit. Thus, these approaches are not favorable to the miniaturizing MEMS gyroscope.

Moreover, in the angle measuring process of the conventional MEMS gyroscope, the angular velocity of the gyroscope module of the MENS gyroscope must be measured first. Then, the rotating angle is obtained after executing an integration process on the measured angular velocity. However, not only the measurement signal is integrated, but also the noise signal, resulting in the error of the measurement of the rotating angle of the conventional MEMS gyroscope always increasing with the duration of the integration process.

Therefore, an MEMS gyroscope capable of precluding the execution of an off-line calibration process for the error introduced by the sensing circuit defect and the mechanical structure defect of its gyroscope module, and of calculating the rotating angle of the DUT without the execution of an integration process is required by the industry.

SUMMARY OF THE INVENTION

The object of the present invention is to provide an MEMS gyroscope capable of precluding the execution of an off-line calibration process for the error introduced by the sensing circuit defect and by the mechanical structure defect of its gyroscope module, and calculating the rotating angle of the DUT being attached thereto.

The object of the present invention is to provide an MEMS gyroscope capable of precluding the execution of an integration process, and calculating the rotating angle of the DUT being attached thereto.

To achieve the object, the MEMS gyroscope of the present invention associated with a DUT, comprises a gyroscope module, having a plurality of system parameters; a sensing module, coupled with the gyroscope module for sensing a system dynamic of the gyroscope module; and a control module, coupled with the gyroscope module and the sensing module for receiving the system dynamic sensed by the sensing module, applying a gyroscope control method to control the gyroscope module, and calculating the rotating angle of the DUT which the MEMS gyroscope being attached thereto. Wherein, the gyroscope control method comprises the steps of: outputting a preliminary control signal including a first extra frequency signal and a second extra frequency signal to the gyroscope module, for driving the gyroscope module; estimating estimated value of the plurality of system parameters based on the received system dynamic, then calculating a first compensation signal based on the estimated value of the plurality of system parameters, wherein the first compensation signal includes the first extra frequency signal and the second extra frequency signal; outputting the first compensation signal to the gyroscope module; estimating another estimated value of the plurality of system parameters based on another received system dynamic, then calculating a second compensation signal based on the another estimated value of the plurality of system parameters, wherein the second compensation signal includes the first extra frequency signal and the second extra frequency signal. Applying a filter unit and an angle calculating unit to calculate the rotating angle of the DUT based on the estimated system dynamic at the time.

Therefore, since the control module of the MEMS gyroscope of the present invention applies a gyroscope control method to control the gyroscope module and to calculate the rotating angle of a DUT, to which the MEMS gyroscope of the present invention is attached, wherein the control module outputs the control signal to the gyroscope module and the estimated gyroscope dynamics to calculate the rotation angle, based on the gyroscope control method. The control signal, such as a preliminary control signal, a first compensation signal, a second compensation signal, and the continued control signal hereinafter, includes a first extra frequency signal and a second extra frequency signal, wherein the first extra frequency signal and the second extra frequency signal are both different from the characteristic frequency of the gyroscope module. The MEMS gyroscope of the present invention can on-line compensate the error introduced by the sensing circuit defect and by the mechanical structure defect of its gyroscope module. Thus, the MEMS gyroscope of the present invention can calculate the rotating angle of the DUT, to which the MEMS gyroscope of the present invention is attached, without the execution of an off-line calibration process, and the execution of an integration process.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
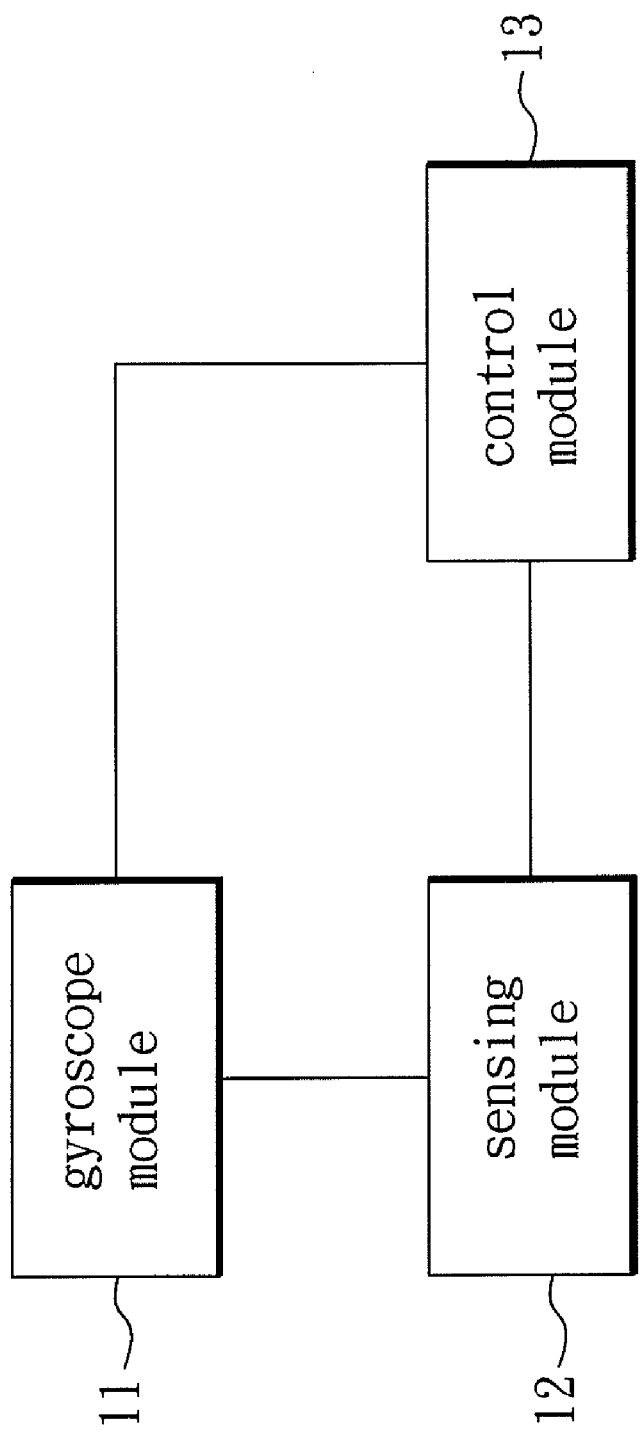
FIG. 1 displays the element of the MEMS gyroscope according to the first embodiment of the present invention.

As shown in FIG. 1, the MEMS gyroscope according to the first embodiment of the present invention, associated with a device under test (abbreviated as DUT), which is not shown in the figure, comprises: a gyroscope module 11, a sensing module 12 and a control module 13, wherein the gyroscope module 11 has a plurality of system parameters (not shown in the figure), the sensing module 12 is coupled with the gyroscope module 11 for sensing a system dynamic (not shown in the figure) of the gyroscope module 11. Besides, the control module 13 is coupled with the gyroscope module 11 and the sensing module 12 for receiving the system dynamic (not shown in the figure) sensed by the sensing module 12, applying a gyroscope control method to control the gyroscope module 11, and calculating the rotating angle of the DUT (not shown in the figure) which the MEMS gyroscope according to the first embodiment of the present invention is attached thereto. Detailed description on the "system parameters" and the "system dynamic" will be provided thereinafter.

Figure 2:
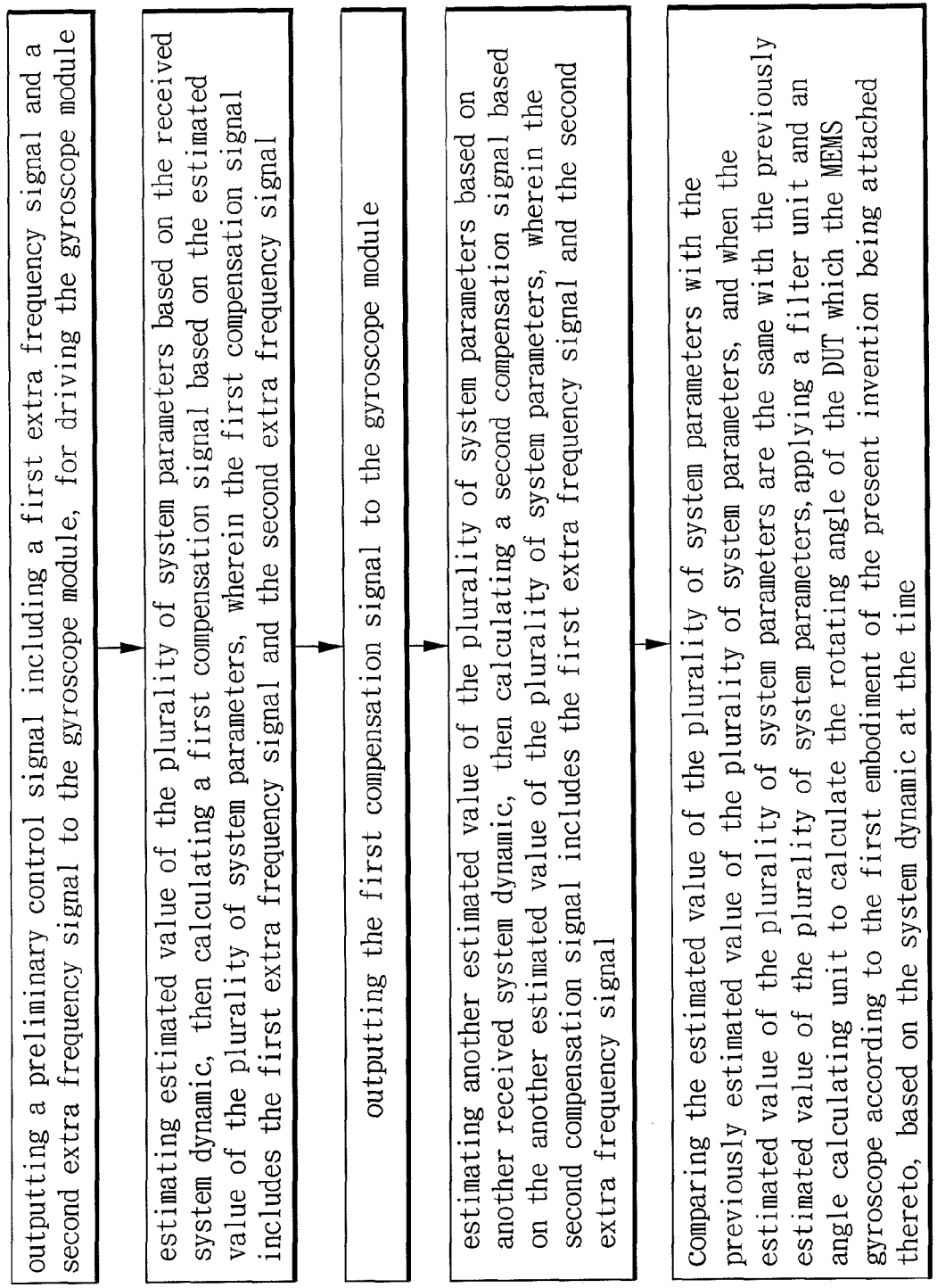
FIG. 2 displays the flowchart of the gyroscope control method applied by the control module of the MEMS gyroscope according to the first embodiment of the present invention.

As shown in FIG. 2, the gyroscope control method applied by the control module of the MEMS gyroscope according to the first embodiment of the present invention comprises the following steps of:

outputting a preliminary control signal ($U_0$) including a first extra frequency signal ($\tilde{\omega}_x$) and a second extra frequency signal ($\tilde{\omega}_y$) to the gyroscope module, for driving the gyroscope module;

estimating estimated value of the plurality of system parameters based on the received system dynamic, then calculating a first compensation signal ($U_1$) based on the estimated value of the plurality of system parameters, wherein the first compensation signal ($U_1$) includes the first extra frequency signal ($\tilde{\omega}_x$) and the second extra frequency signal ($\tilde{\omega}_y$);

outputting the first compensation signal ($U_1$) to the gyroscope module;

estimating another estimated value of the plurality of system parameters based on another received system dynamic, then calculating a second compensation signal ($U_2$) based on the another estimated value of the plurality of system parameters, wherein the second compensation signal ($U_2$) includes the first extra frequency signal ($\tilde{\omega}_x$) and the second extra frequency signal ($\tilde{\omega}_y$); and comparing the estimated value of the plurality of system parameters with the previously estimated value of the plurality of system parameters, and when the estimated value of the plurality of system parameters are the same with the previously estimated value of the plurality of system parameters, i.e. while the estimated states converge to their correct values, applying a filter unit and an angle calculating unit to calculate the rotating angle of the DUT which the MEMS gyroscope according to the first embodiment of the present invention is attached thereto, based on the system dynamic at the time.

Figure 3:
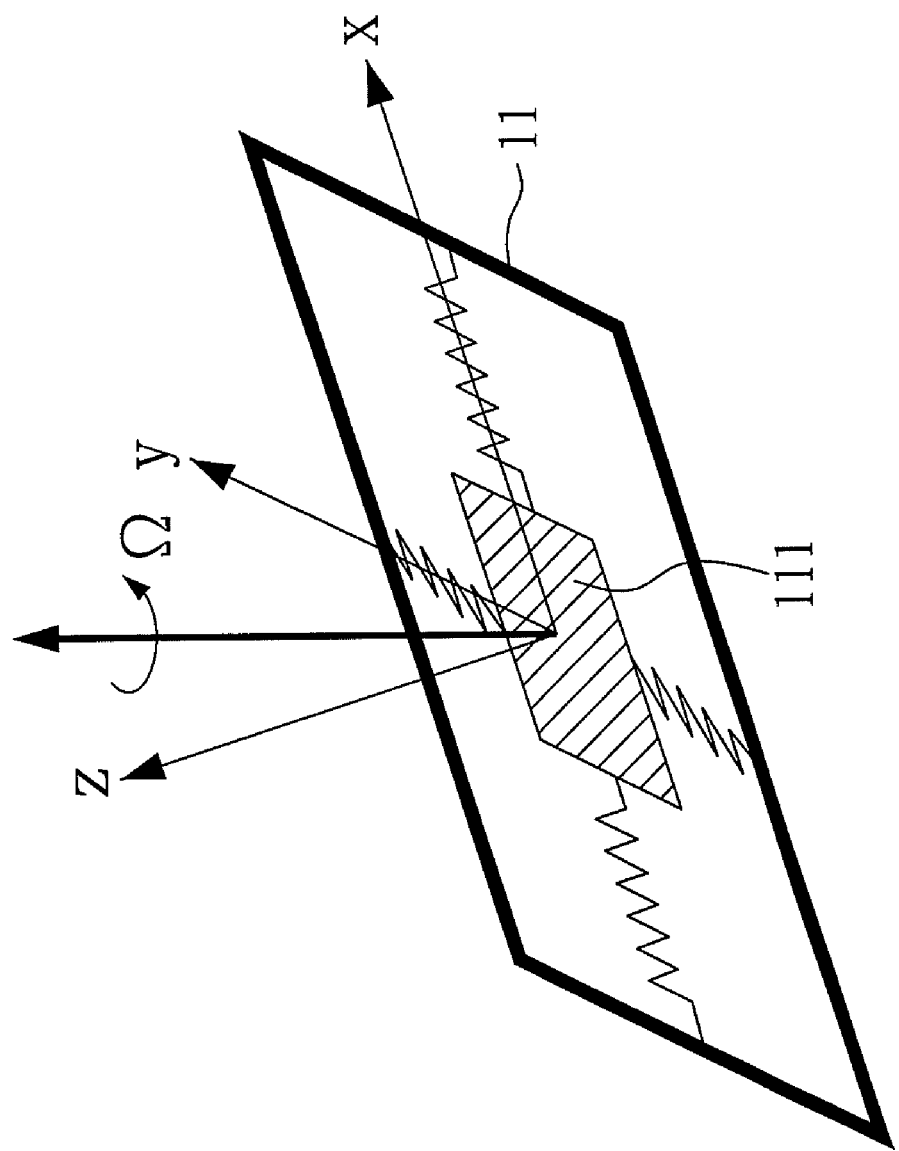
FIG. 3 is a perspective view of the MEMS gyroscope according to the first embodiment of the present invention.

In the following, the process for calculating the rotating angle of the DUT, which the MEMS gyroscope according to the first embodiment of the present invention is attached thereto, will be described below in company with the figures:

FIG. 3 is a perspective view of the MEMS gyroscope according to the first embodiment of the present invention. In the present embodiment, the gyroscope module 11 is a single-axis vibrating MEMS gyroscope. The sensing module 12 is a position sensor device or a velocity sensor device. Besides, the dynamic of the proof mass 111 of the gyroscope module 11 is limited on an X-Y plane, for measuring the rotating angular velocity ($\Omega_z$) and the rotating angle of the proof mass 111 along the Z-axis. Therefore, the dynamic of the proof mass 111 along the X-axis and the Y-axis can be described by the following formulas:

$$m\ddot{x}+d_{xx}\dot{x}+d_{xy}\dot{y}+k_{xx}x+k_{xy}y=u_x+2m\Omega_z\dot{y}$$

$$m\ddot{y}+d_{xy}\dot{x}+d_{yy}\dot{y}+k_{xy}x+k_{yy}y=u_y-2m\Omega_z\dot{x} \quad \text{formula (1)}$$

Wherein, m is the mass of the proof mass; $d_{xx}$, $d_{yy}$ are the damping coefficients of the gyroscope module along the X-axis and the Y-axis, respectively; $k_{xx}$, $k_{yy}$ are the stiffness coefficients of the gyroscope module along the X-axis and the Y-axis, respectively; $d_{xy}$ is the cross axis damping coefficient; and $k_{xy}$ is the cross axis stiffness coefficient.

Then, after organization, the aforementioned formula (1) can be expressed as:

$$\ddot{x}+(d_{xx}/m)\dot{x}+(d_{xy}/m)\dot{y}+(k_{xx}/m)x+(k_{xy}/m)y=u_x/m+2\Omega_z\dot{y}$$

$$\ddot{y}+(d_{xy}/m)\dot{x}+(d_{yy}/m)\dot{y}+(k_{xy}/m)x+(k_{yy}/m)y=u_y/m-2\Omega_z\dot{x} \quad \text{formula (2)}$$

However, due to the mechanical structure defect of the gyroscope module 11 of the MEMS gyroscope according to the first embodiment of the present invention, the value of the system parameters may be different from the design value of the system parameters. As a result, there are 8 system parameters in the present embodiment, i.e. $k_{xx}$, $k_{yy}$, $k_{xy}$, $d_{xx}$, $d_{yy}$, $d_{xy}$, $\Omega_z$ (the angular velocity of the gyroscope module), and m (the mass of the proof mass of the gyroscope module), wherein the actual value of these 8 system parameters are unknown, and the actual value of these 8 system parameters will be estimated by the control module 13 later.

For computing the value of these 8 system parameters, the control module of the MEMS gyroscope according to the first embodiment of the present invention estimates the estimated value of these 8 system parameters, by means of building up a state observer and based on the system dynamic of the gyroscope module 11 sensed by the sensing module 12. In the present embodiment, the system dynamic of the gyroscope module 11 includes at least one of the position of the proof mass 111 of the gyroscope module 11 (x, y), and/or the velocity of the proof mass ($\dot{x}$, $\dot{y}$).

For building up the aforementioned state observer, the formula (2) can be re-written into the form below:

$$\dot{X} = f(X) + BU$$

$$Z = HX + \bar{n} \qquad \text{formula (3)}$$

Wherein, $$X = [x \quad \dot{x} \quad y \quad \dot{y} \quad \Omega_z \quad k_{xx} \quad k_{yy} \quad k_{xy} \quad d_{xx} \quad d_{yy} \quad d_{xy} \quad m]$$

$$B = \begin{bmatrix} 0 & 1 & 0 & 0 \\ 0 & 0 & 0 & 1 \end{bmatrix} [0]_{2 \times 8} \Big]^T$$

$$U = \begin{bmatrix} u_x \\ u_y \end{bmatrix} \quad \bar{n} = \begin{bmatrix} n_x \\ n_y \end{bmatrix}$$

$$f(X) = \begin{bmatrix} \dot{x} \\ -(k_{xx}/m)x - (k_{xy}/m)y - (d_{xx}/m)\dot{x} - (d_{xy}/m)\dot{y} + 2\Omega_z \dot{y} \\ \dot{y} \\ -(k_{xy}/m)x - (k_{yy}/m)y - (d_{xy}/m)\dot{x} - (d_{yy}/m)\dot{y} - 2\Omega_z \dot{x} \\ 0 \\ \vdots \\ 0 \end{bmatrix}_{12 \times 1}$$

$$H = \begin{bmatrix} 0 & 1 & 0 & 0 \\ 0 & 0 & 0 & 1 \end{bmatrix} [0]_{2 \times 8} \Big]$$

Therefore, both of the "system dynamic" and the "system parameters" are integrated into a single dynamic system. In the present embodiment, since the actual value of the system parameters ($k_{xx}$, $k_{yy}$, $k_{xy}$, $d_{xx}$, $d_{yy}$, $d_{xy}$, $\Omega_z$, and m) are fixed value, i.e. these actual value will not be varied during the operation of the MEMS gyroscope, the aforementioned state observer can be represented as:

$$\dot{\hat{X}} = f(\hat{X}) + BU + LH(X - \hat{X})$$

$$\hat{Z} = H\hat{X} \qquad \text{formula (4)}$$

Wherein, $\hat{X}$ represents the estimated value of the system parameters, L is the observer gain. In the present embodiment, the observer gain L is obtained through the Lyapunov method.

As described above, the control module of the MEMS gyroscope according to the first embodiment of the present invention calculates the rotating angle of the DUT, to which the MEMS gyroscope according to the first embodiment of the present invention is attached, by applying a gyroscope control method (as shown in FIG. 2). Detailed application steps of the gyroscope control method are described below:

First, the control module 13 outputs a preliminary control signal ($U_0$) including a first extra frequency signal ($\tilde{\omega}_x$) and a second extra frequency signal ($\tilde{\omega}_y$) to the gyroscope module 11. The preliminary control signal ($U_0$) can be represented as:

$$U_0 = \frac{1}{\hat{m}} \begin{bmatrix} \hat{d}_{xx}\dot{\hat{x}} + \hat{d}_{xy}\dot{\hat{y}} + \hat{k}_{xx}\hat{x} + \hat{k}_{xy}\hat{y} - k\hat{x} + \tilde{\omega}_x \\ \hat{d}_{xy}\dot{\hat{x}} + \hat{d}_{yy}\dot{\hat{y}} + \hat{k}_{xy}\hat{x} + \hat{k}_{yy}\hat{y} - k\hat{y} + \tilde{\omega}_y \end{bmatrix} \qquad \text{formula (5)}$$

Wherein, after being controlled by the control signal of formula (5), the gyroscope module 11 has a characteristic frequency $$\left( \frac{1}{2} \sqrt{\frac{k}{\hat{m}}} \right).$$

Besides, the aforementioned first extra frequency signal ($\tilde{\omega}_x$) and the second extra frequency signal ($\tilde{\omega}_y$) are smaller than the characteristic frequency. In the present embodiment, the first extra frequency signal ($\tilde{\omega}_x$) is a sine function signal of 450 Hz, while the second extra frequency signal ($\tilde{\omega}_y$) is a sine function signal of 500 Hz.

Then, the control module 13 estimates the estimated value of the aforementioned 8 system parameters, using the aforementioned state observer and basing on the system dynamic (x, y and/or $\dot{x}$, $\dot{y}$) of the gyroscope module 11 sensed by the sensing module 12. Moreover, comparing with the 8 system parameters used for calculating the preliminary control signal ($U_0$), at least one of the 8 system parameters is varied.

Later, the control module 13 calculates a first compensation signal ($U_1$) based on the estimated value of these system parameters, wherein the first compensation signal ($U_1$) still includes the first extra frequency signal ($\tilde{\omega}_x$) and the second extra frequency signal ($\tilde{\omega}_y$). The first compensation signal ($U_1$) can be represented as:

$$U_1 = \frac{1}{\hat{m}} \begin{bmatrix} \hat{d}_{xx}\dot{\hat{x}} + \hat{d}_{xy}\dot{\hat{y}} + \hat{k}_{xx}\hat{x} + \hat{k}_{xy}\hat{y} - k\hat{x} + \tilde{\omega}_x \\ \hat{d}_{xy}\dot{\hat{x}} + \hat{d}_{yy}\dot{\hat{y}} + \hat{k}_{xy}\hat{x} + \hat{k}_{yy}\hat{y} - k\hat{y} + \tilde{\omega}_y \end{bmatrix} \qquad \text{formula (6)}$$

After that, the control module 13 outputs the first compensation signal ($U_1$) to the gyroscope module 11, for driving the gyroscope module 11. Then, the control module 13 estimates another estimated value of the aforementioned 8 system parameters, using the aforementioned state observer and basing on the system dynamic (x, y and/or $\dot{x}$, $\dot{y}$) of the gyroscope module 11 sensed by the sensing module 12 once again.

Then, the control module 13 calculates a second compensation signal ($U_2$) based on the another estimated value of these system parameters, wherein the second compensation signal ($U_2$) also includes the first extra frequency signal ($\tilde{\omega}_x$) and the second extra frequency signal ($\tilde{\omega}_y$). The second compensation signal ($U_2$) can be represented as:

$$U_2 = \frac{1}{\hat{m}} \begin{bmatrix} \hat{d}_{xx}\dot{\hat{x}} + \hat{d}_{xy}\dot{\hat{y}} + \hat{k}_{xx}\hat{x} + \hat{k}_{xy}\hat{y} - k\hat{x} + \tilde{\omega}_x \\ \hat{d}_{xy}\dot{\hat{x}} + \hat{d}_{yy}\dot{\hat{y}} + \hat{k}_{xy}\hat{x} + \hat{k}_{yy}\hat{y} - k\hat{y} + \tilde{\omega}_y \end{bmatrix} \qquad \text{formula (7)}$$

At the moment, the control module 13 compares the second compensation signal ($U_2$) with the first compensation signal ($U_1$). When they are different from each other, the control module 13 outputs the second compensation signal ($U_2$) to the gyroscope module 11, for driving the gyroscope module 11.

Then, following the process described above, the control module 13 calculates a third compensation signal ($U_3$) and compares the third compensation signal ($U_3$) with the second compensation signal ($U_2$). It should be noted that, the control module 13 will execute the same process above continuously, i.e. calculating different compensation signals ($U_n$) and outputting the compensation signals ($U_n$) to the gyroscope module 11, until the compensation signal calculated out at the next time point ($U_{n+1}$) equals to the compensation signal calculated out at the current time point ($U_n$).

Figure 4:
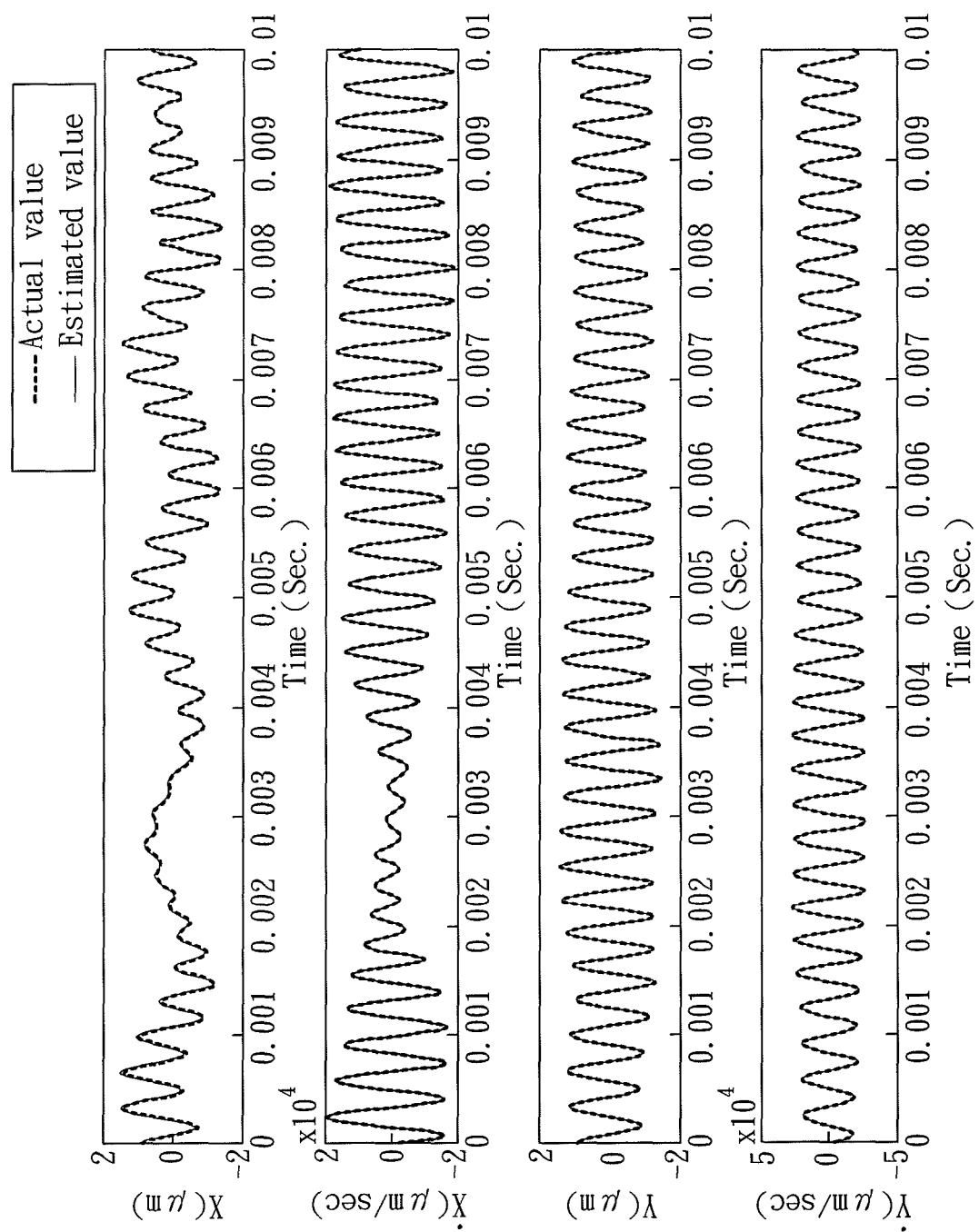
FIG. 4 displays the variation trend of the estimated value of the system dynamic of the gyroscope module of the MEMS gyroscope according to the first embodiment of the present invention.
Figure 5:
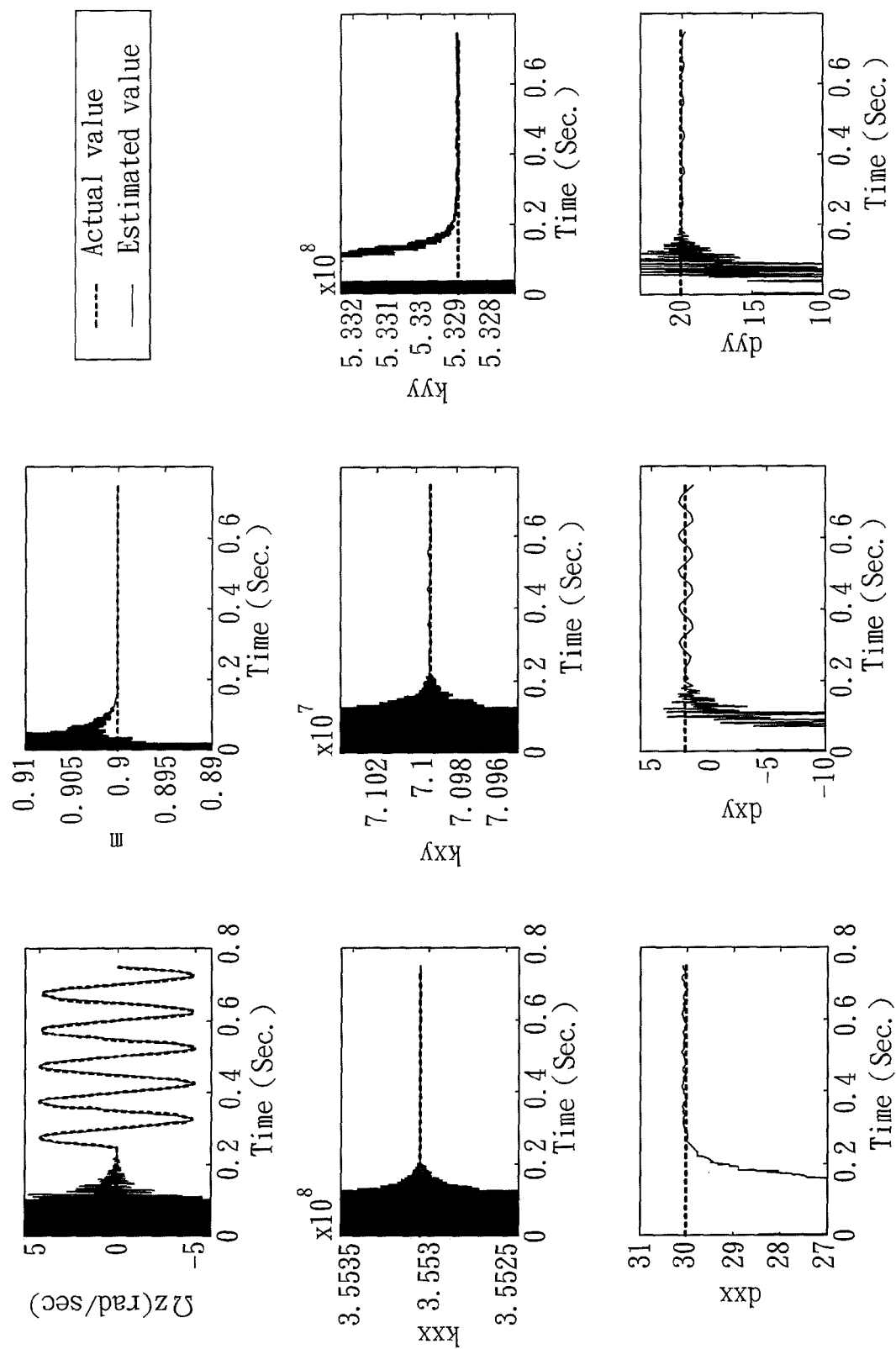
FIG. 5 displays the variation trend of the estimated value of the 8 system parameters of the gyroscope module of the MEMS gyroscope according to the first embodiment of the present invention.

FIG. 4 displays the variation trend of the estimated value of the system dynamic of the gyroscope module of the MEMS gyroscope according to the first embodiment of the present invention, when the control module thereof applies the gyroscope control method. In the figure, every estimated value of the parameters of the system dynamic (x, y and/or $\dot{x}$, $\dot{y}$) converge to their actual convergence value respectively and rapidly. Besides, FIG. 5 displays the variation trend of the estimated value of the 8 system parameters of the gyroscope module of the MEMS gyroscope according to the first embodiment of the present invention, wherein the estimated value of these 8 system parameters ($k_{xx}$, $k_{yy}$, $k_{xy}$, $d_{xx}$, $d_{yy}$, $d_{xy}$, $\Omega_z$, and m) converge to their actual convergence value in 0.3 second.

When the estimated value of the parameters of the system dynamic and the 8 system parameters of the gyroscope module converge to their actual convergence value, the control module 13 applies a filter unit and an angle calculating unit in sequence, for calculating the rotating angle of the DUT which the MEMS gyroscope according to the first embodiment of the present invention is attached thereto, based on the system dynamic used for calculating out the second compensation signal ($U_2$).

Figure 6:
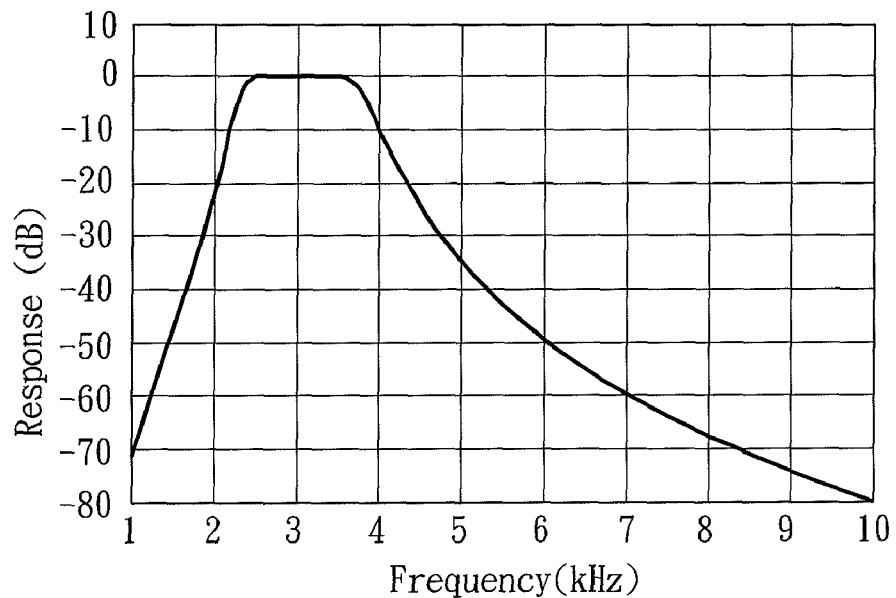
FIG. 6 displays the frequency response of the filter unit of the MEMS gyroscope according to the first embodiment of the present invention.

In the present embodiment, the aforementioned filter unit is a band-pass filter, whose frequency response is shown in FIG. 6. As shown in FIG. 6, the pass-band of the band-pass filter unit is between 2.5 kHz and 3.5 kHz, wherein the characteristic frequency of the gyroscope module 11 is within the pass-band of the band-pass filter unit, for filtering the signal having the frequency near the characteristic frequency. At this time, the system dynamic of the gyroscope module 11 can be expressed as:

$$\bar{x}=BPF(\hat{x}), \bar{\dot{x}}=BPF(\hat{\dot{x}})$$

$$\bar{y}=BPF(\hat{y}), \bar{\dot{y}}=BPF(\hat{\dot{y}}) \quad \text{formula (8)}$$

Then, the control module 13 brings these 4 parameters into the aforementioned angle calculating unit, for calculating the rotating angle ($\phi$) of the DUT which the MEMS gyroscope according to the first embodiment of the present invention is attached thereto. In the present embodiment, the angle calculating unit can be represented as:

$$\phi = \bar{\phi} = \frac{1}{2}\arctan\left(\frac{2(k\cdot\bar{x}\cdot\bar{y}+\bar{\dot{x}}\cdot\bar{\dot{y}})}{k\cdot(\bar{x}^2-\bar{y}^2)+(\bar{\dot{x}}^2-\bar{\dot{y}}^2)}\right) \quad \text{formula (9)}$$

Figure 7:
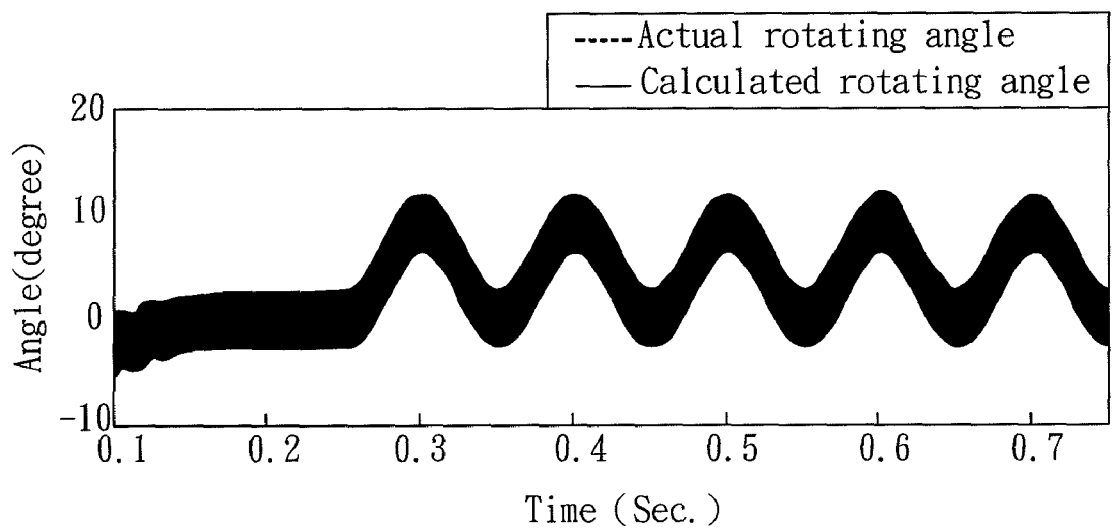
FIG. 7 displays the comparison between the rotating angle ($\phi$) of the DUT calculated by the control module of the MEMS gyroscope according to the first embodiment of the present invention, and the actual rotating angle of the DUT.

The comparison between the calculated rotating angle ($\phi$) of the DUT and the actual rotating angle of the DUT is shown in FIG. 7. In the figure, the rotating angle calculated by the control module 13 of the MEMS gyroscope according to the first embodiment of the present invention coincides with the actual rotating angle of the DUT. Besides, the calculating result responds rapidly to the change of the variation of the actual angle, preventing any "lag" in response from happening.

Therefore, by applying the gyroscope control method of FIG. 2, the MEMS gyroscope according to the first embodiment of the present invention can on-line compensate the error introduced by the sensing circuit defect and by the mechanical structure defect of the gyroscope module thereof, and calculate the rotating angle of the DUT which the MEMS gyroscope according to the first embodiment of the present invention is attached thereto without the execution of a complex integration process.

In the MEMS gyroscope according to a second embodiment of the present invention, the actual value of all the system parameters ($k_{xx}$, $k_{yy}$, $k_{xy}$, $d_{xx}$, $d_{yy}$, $d_{xy}$, $\Omega_z$, and m) are unknown, and some of the system parameters are not fixed value, i.e. their value will be varied during the operation of the MEMS gyroscope. Besides, since the gyroscope control method applied by the control module of the MEMS gyroscope according to the second embodiment of the present invention is the same as the gyroscope control method applied by the control module of the MEMS gyroscope according to the first embodiment of the present invention, detailed description regarding the gyroscope control method will be omitted hereinafter.

However, unlike the first extra frequency signal ($\tilde{\omega}_x$) and the second extra frequency signal ($\tilde{\omega}_y$) of the first embodiment, the first extra frequency signal ($\tilde{\omega}_x$) and the second extra frequency signal ($\tilde{\omega}_y$) of the present embodiment are not limited to be smaller than the characteristic frequency of the gyroscope module any more, they are merely limited to be different from the characteristic frequency of the gyroscope module. Besides, in the present embodiment, the first extra frequency signal ($\tilde{\omega}_x$) is a sine function signal of 450 Hz, while the second extra frequency signal ($\tilde{\omega}_y$) is a sine function signal of 500 Hz.

Figure 8:
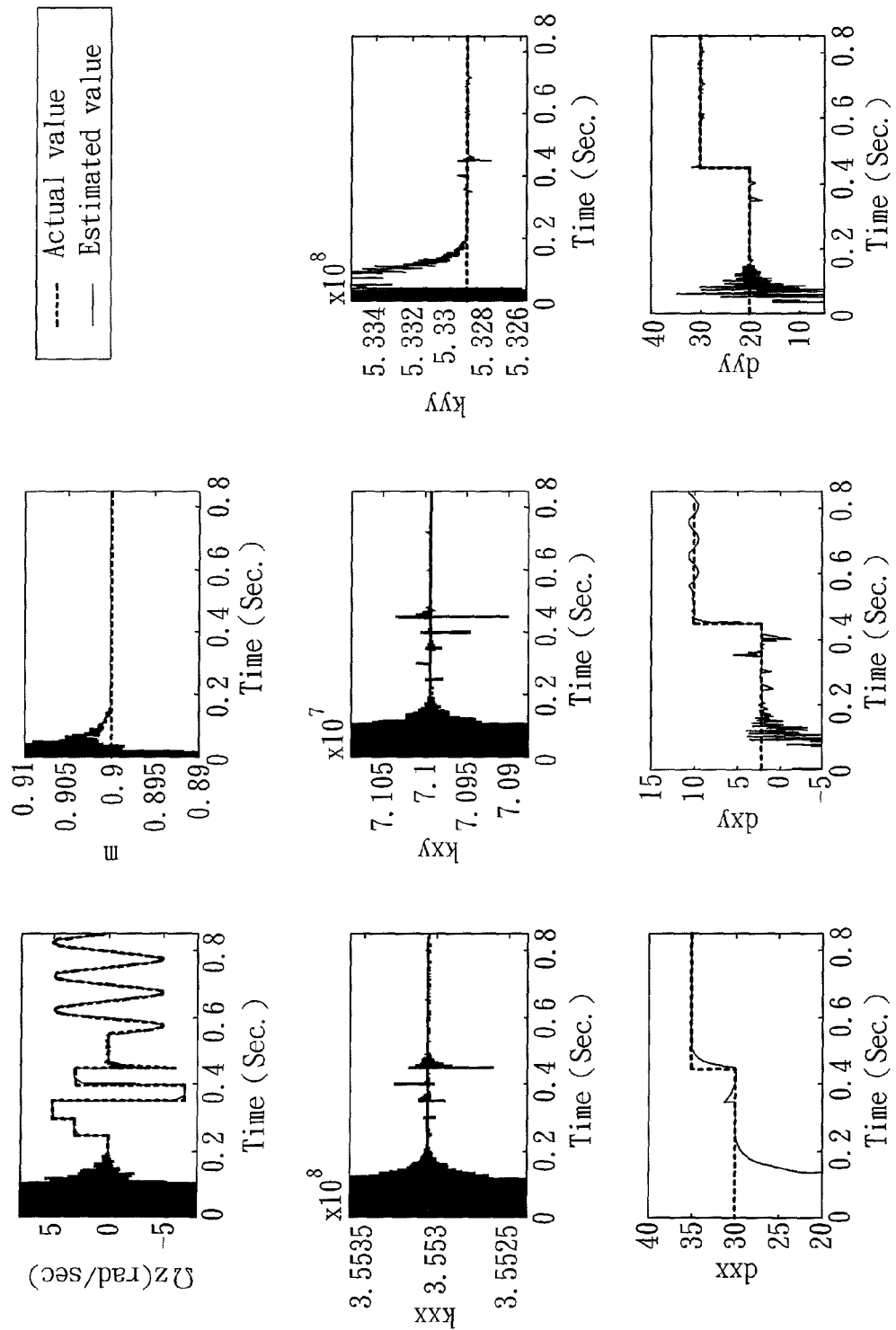
FIG. 8 displays the variation trend of the estimated value of the system dynamic of the gyroscope module of the MEMS gyroscope according to the second embodiment of the present invention.

FIG. 8 displays the variation trend of the estimated value of the system dynamic of the gyroscope module of the MEMS gyroscope according to the second embodiment of the present invention, when the control module thereof applies the gyroscope control method. In the figure, the angular velocity ($\Omega_z$) varies into a sine wave from the square wave at the beginning, after 0.55 second. Besides, the damping coefficients ($d_{xx}$, $d_{yy}$, and $d_{xy}$) vary rapidly and dramatically. However, even though such a variation in angular velocity of the gyroscope module happens, these 8 system parameters ($k_{xx}$, $k_{yy}$, $k_{xy}$, $d_{xx}$, $d_{yy}$, $d_{xy}$, $\Omega_z$, and m) of the gyroscope module of the MEMS gyroscope according to the second embodiment of the present invention can still converge to their actual convergence value rapidly.

Similar to the control module of the MEMS gyroscope according to the first embodiment of the present invention, when the estimated value of the plurality of system parameters are the same with the previously estimated value of the plurality of system parameters, i.e. while the estimated states converge to their correct values, the control module of the MEMS gyroscope according to the second embodiment of the present invention applies a filter unit and an angle calculating unit, for calculating the rotating angle of the DUT which the MEMS gyroscope according to the second embodiment of the present invention is attached thereto, based on the system dynamic used for calculating out the second compensation signal ($U_2$).

In the second embodiment of the present invention, the control module applies an angle calculating unit, for calculating an estimated value of the rotating angle ($\hat{\phi}$), based on the system dynamic used for calculating out the second compensation signal ($U_2$). Besides, the angle calculating unit can be represented as:

$$\hat{\phi} = \frac{1}{2}\arctan\left(\frac{2(k\cdot\hat{x}\cdot\hat{y}+\hat{\dot{x}}\cdot\hat{\dot{y}})}{k\cdot(\hat{x}^2-\hat{y}^2)+(\hat{\dot{x}}^2-\hat{\dot{y}}^2)}\right) \quad \text{formula (10)}$$

Then, a low-pass filter unit is used for filtering the estimated value of the rotating angle ($\hat{\phi}$), for calculating the rotating angle of the DUT ($\phi$), which the MEMS gyroscope according to the second embodiment of the present invention is attached thereto. Thus, the rotating angle of the DUT can be represented as:

$$\phi = LPF(\hat{\phi}) \quad \text{formula (11)}$$

Figure 9:
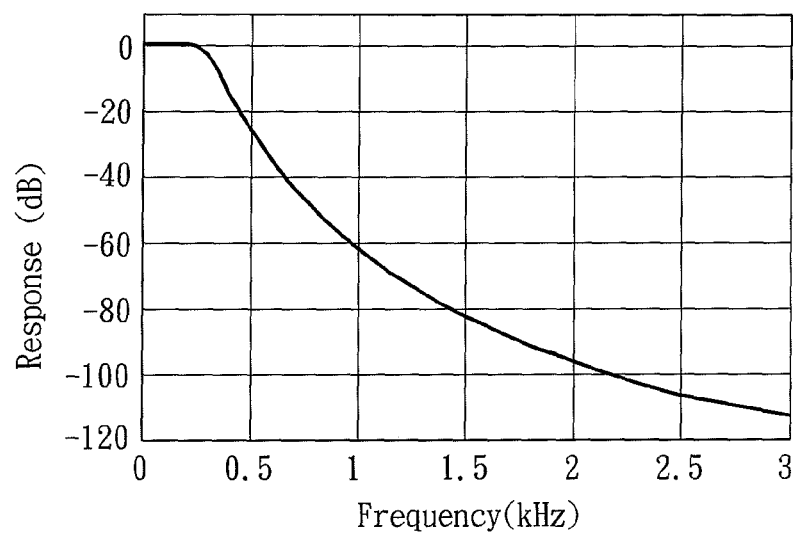
FIG. 9 displays the frequency response of the filter unit of the MEMS gyroscope according to the second embodiment of the present invention.

As shown in FIG. 9, which is the frequency response diagram of the low-pass filter, the cut-off frequency of the low-pass filter is 0.2 kHz. Therefore, the upper limit of the variation frequency of the angular velocity of the gyroscope module is 0.2 kHz.

Figure 10:
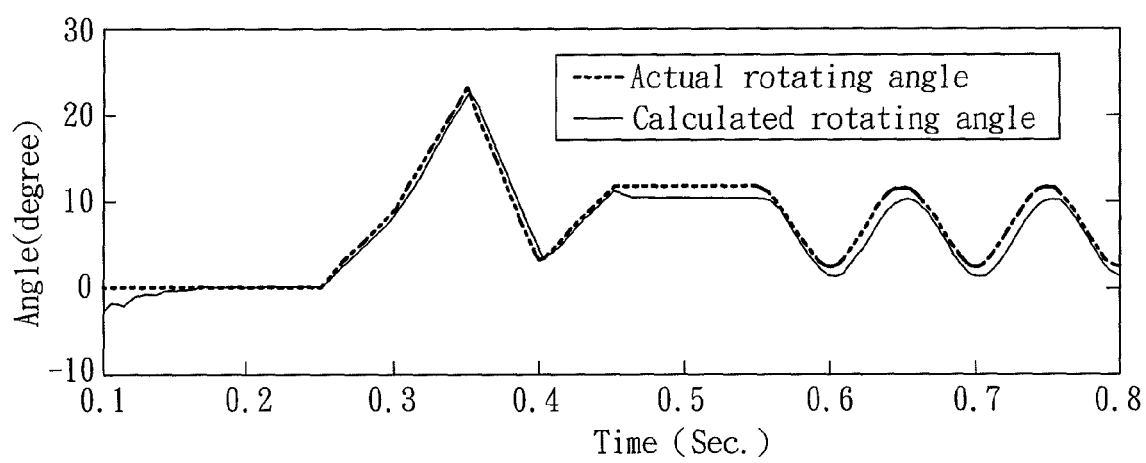
FIG. 10 displays the comparison between the rotating angle ($\phi$) of the DUT calculated by the control module of the MEMS gyroscope according to the second embodiment of the present invention, and the actual rotating angle of the DUT.

The comparison between the calculated rotating angle ($\phi$) of the DUT and the actual rotating angle of the DUT is shown in FIG. 10. In the figure, even though the angular velocity of the DUT ($\Omega_z$) varies into a sine wave from the square wave at the beginning after 0.55 second, and the damping coefficients ($d_{xx}$, $d_{yy}$, and $d_{xy}$) vary dramatically at 0.45 second, the rotating angle calculated by the control module of the MEMS gyroscope according to the second embodiment of the present invention coincides with the actual rotating angle of the DUT. That is, the MEMS gyroscope according to the second embodiment of the present invention can control the error value to be within an acceptable range (on-line error compensation), thus precluding the requirement to shut down the operation of the MEMS gyroscope, for executing an off-line calibration process.

Therefore, by applying the gyroscope control method of FIG. 2, the MEMS gyroscope according to the second embodiment of the present invention can on-line compensate the error introduced by the sensing circuit defect and by the mechanical structure defect of the gyroscope module thereof, and calculate the rotating angle of the DUT which the MEMS gyroscope according to the second embodiment of the present invention is attached thereto without the execution of a complex integration process.

As described above, since the control module of the MEMS gyroscope of the present invention applies a gyroscope control method to control the gyroscope module and to calculate the rotating angle of a DUT, to which the MEMS gyroscope of the present invention is attached, wherein the control module outputs the control signal to the gyroscope module based on the gyroscope control method. The control signal, such as a preliminary control signal, a first compensation signal, a second compensation signal, and the continued control signal hereinafter, includes a first extra frequency signal and a second extra frequency signal, wherein the first extra frequency signal and the second extra frequency signal are both different from the characteristic frequency of the gyroscope module. The MEMS gyroscope of the present invention can on-line compensate the error introduced by the sensing circuit defect and by the mechanical structure defect of its gyroscope module. Thus, the MEMS gyroscope of the present invention can calculate the rotating angle of the DUT, to which the MEMS gyroscope of the present invention is attached, without the execution of an off-line calibration process, and the execution of an integration process.

Although the present invention has been explained in relation to its preferred embodiment, it is to be understood that many other possible modifications and variations can be made without departing from the scope of the invention as hereinafter claimed.

What is claimed is:

1. An MEMS gyroscope, associated with a DUT, comprising:
a gyroscope module, having a plurality of system parameters;
a sensing module, coupled with the gyroscope module for sensing a system dynamic of the gyroscope module; and
a control module, coupled with the gyroscope module and the sensing module for receiving the system dynamic sensed by the sensing module, applying a gyroscope control method to control the gyroscope module, and calculating a rotating angle of the DUT which the MEMS gyroscope being attached thereto;
wherein the gyroscope control method comprises the steps of
outputting a preliminary control signal including a first extra frequency signal and a second extra frequency signal to the gyroscope module, for driving the gyroscope module;
estimating a first estimated value of the plurality of system parameters based on the received system dynamic, then calculating a first compensation signal based on the estimated value of the plurality of system parameters, wherein the first compensation signal includes the first extra frequency signal and the second extra frequency signal;
outputting the first compensation signal to the gyroscope module;
estimating a second estimated value of the plurality of system parameters based on another received system dynamic, then calculating a second compensation signal based on the second estimated value of the plurality of system parameters, wherein the second compensation signal includes the first extra frequency signal and the second extra frequency signal; and
comparing the second estimated value of the plurality of system parameters with the first estimated value of the plurality of system parameters, and when the second estimated value of the plurality of system parameters are the same with the first estimated value of the plurality of system parameters, applying a filter unit and an angle calculating unit to calculate the rotating angle of the DUT based on the system dynamic at the time.

2. The MEMS gyroscope as claimed in claim 1, wherein the MEMS gyroscope is a vibrating MEMS gyroscope.

3. The MEMS gyroscope as claimed in claim 1, wherein the system parameters includes at least two of: a mass of a proof mass of the gyroscope module, damping coefficients of the gyroscope module, stiffness coefficients of the gyroscope module, and an angular velocity of the gyroscope module.

4. The MEMS gyroscope as claimed in claim 1, wherein the system dynamic includes at least one of: a position of a proof mass of the gyroscope module, and a velocity of a proof mass of the gyroscope module.

5. The MEMS gyroscope as claimed in claim 1, wherein the sensing module is a position sensor device or a velocity sensor device.

6. The MEMS gyroscope as claimed in claim 1, wherein the control module estimates the estimated value of the plurality of system parameters based on the system dynamic of the gyroscope module, by means of building up a state observer.

7. The MEMS gyroscope as claimed in claim 6, wherein the state observer has an observer gain, and the observer gain is obtained through the Lyapunov method.

8. The MEMS gyroscope as claimed in claim 1, wherein the gyroscope module has a characteristic frequency.

9. The MEMS gyroscope as claimed in claim 8, wherein the filter unit is a band-pass filter unit, and in the gyroscope control method, the band-pass filter unit is used for filtering the system dynamic of the gyroscope module when the second estimated value of the plurality of system parameters being equal to the first estimated value of the plurality of system parameters, then, the angle calculating unit calculates the rotating angle of the DUT based on the filtered system dynamic of the gyroscope module.

10. The MEMS gyroscope as claimed in claim 9, wherein the first extra frequency signal and the second extra frequency signal are smaller than the characteristic frequency of the gyroscope module, and the characteristic frequency of the gyroscope module is within the pass-band of a band-pass filter unit.

11. The MEMS gyroscope as claimed in claim 8, wherein the filter unit is a low-pass filter unit, and in the gyroscope control method, the angle calculating unit calculates an estimated value of a rotating angle based on the estimated system dynamic of the gyroscope module at the time when the second estimated value of the plurality of system parameters being equal to the first estimated value of the plurality of system parameters, then, the low-pass filter unit is used for filtering the estimated value of the rotating angle and calculating the rotating angle of the DUT.

12. The MEMS gyroscope as claimed in claim 11, wherein the first extra frequency signal and the second extra frequency signal are both different from the characteristic frequency of the gyroscope module, and a cut-off frequency of the low-pass filter unit is an upper limit of a variation frequency of an angular velocity of the gyroscope module.

* * * * *